Feb. 19, 1957     H. P. LUHN     2,782,348

MOTOR DRIVEN PRECISION POSITIONING DEVICE

Filed May 18, 1954     3 Sheets-Sheet 1

INVENTOR.
HANS P. LUHN

BY

ATTORNEY

Feb. 19, 1957     H. P. LUHN     2,782,348
MOTOR DRIVEN PRECISION POSITIONING DEVICE
Filed May 18, 1954     3 Sheets-Sheet 2

INVENTOR.
HANS P. LUHN
BY
ATTORNEY

Feb. 19, 1957  H. P. LUHN  2,782,348
MOTOR DRIVEN PRECISION POSITIONING DEVICE
Filed May 18, 1954  3 Sheets-Sheet 3

INVENTOR.
HANS P. LUHN
BY
Joe L. Koerber
ATTORNEY

United States Patent Office 2,782,348
Patented Feb. 19, 1957

2,782,348
MOTOR DRIVEN PRECISION POSITIONING DEVICE

Hans P. Luhn, Armonk, N. Y., assignor to International Business Machines Corporation, New York, N. Y., a corporation of New York Application May 18, 1954, Serial No. 430,655

14 Claims. (Cl. 318—39)

This invention relates to an improved device for automatically controlling a machine tool.

Prior art disclosed a number of devices for moving work pieces and cutting tools under control of template tracers and photo electric line tracers as well as other means for producing objects of a predetermined shape. Also disclosed by prior art are micrometer devices for accurately positioning a work piece relative to a tool. The foregoing devices have been combined to provide automatic duplication of given patterns, but one of the drawbacks of these devices has been that when large movements of the work table and work piece are required a long screw is employed. In such screws a certain degree of error generally exists and over a relatively long distance this error accumulates to undesirable proportions. The present device is designed to minimize this difficulty. A long screw is used for positioning the work table but the operation of this screw is controlled by a very precise measuring device.

In manually obtaining a precise measurement, a plurality of accurately made blocks of known measurement are stacked one on the other to accumulate approximately the desired measurement, and a micrometer caliper is set to the accumulated measurement. The micrometer scale is then used to measure off the additional measurement to be added to the accumulated measurement to give a final setting of the micrometer caliper to the desired measurement.

Electrical equivalents of the above system have been developed and consist of a bar having very accurately located steps or marks that are conveniently spaced and are sensed magnetically and highly accurately. The major portion of a desired distance is measured off by means of these marks, and fractional measurements are taken by a micrometer screw. These systems are operable only in a point to point fashion.

In operating machine tools automatically it is desirable to continuously position a work piece with respect to a tool, and it is also desirable that the continuous positioning be accurately determined. It is therefore an object of this invention to obtain the advantages of the accurate step by step measuring in a continuous positioning operation. This continuous positioning operation is to be accomplished by using two positioning devices alternately over the unit step distances of a measuring bar and having them engage a micrometer screw alternately so that while one such positioning device is cooperating with the measuring bar, the other device is returned to a position with respect to the micro screw one unit removed. After the first such device performs the measuring function over a unit distance, it is disengaged from the microscrew and the returned device is engaged therewith and performs its measuring function over a unit distance. One such device is adapted for moving the work piece support table longitudinally and another such device for moving it laterally whereby the workpiece is moved about the cutting tool to form the desired pattern.

Another object of this device is to provide an improved device for effecting precise and continuous movement of a machine tool work table in a predetermined path.

A more specific object is to provide means for continuously positioning magnetic read heads and other means for causing a work table to follow closely the movement of the heads thereby describing a pattern to be reproduced in a work piece carried by the work table.

Other objects of the invention will be pointed out in the following description and claims and illustrated in the accompanying drawings, which disclose, by way of example, the principle of the invention and the best mode which has been contemplated of applying that principle.

Figures 2, 3, 4:
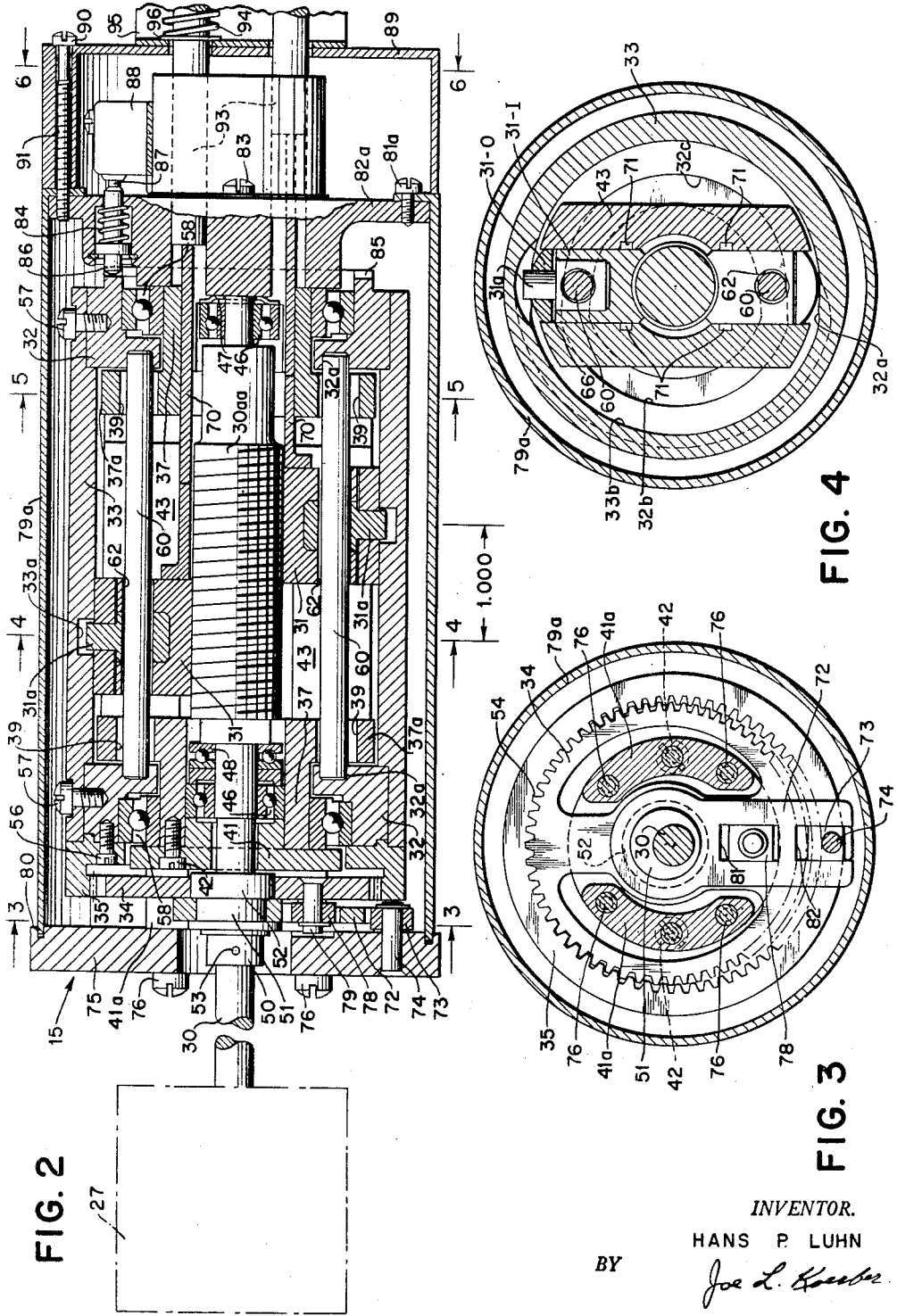
Fig. 2 is a sectional view of the head positioning device.
Fig. 3 is a sectional end view taken on a line 3—3 in Fig. 2 showing a speed reducing gear arrangement.
Figure 6:
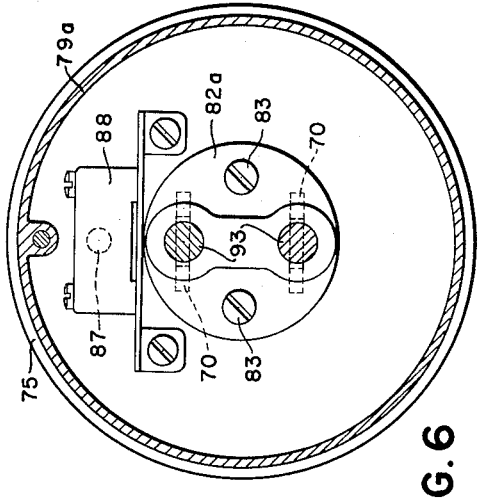
Figure 5:
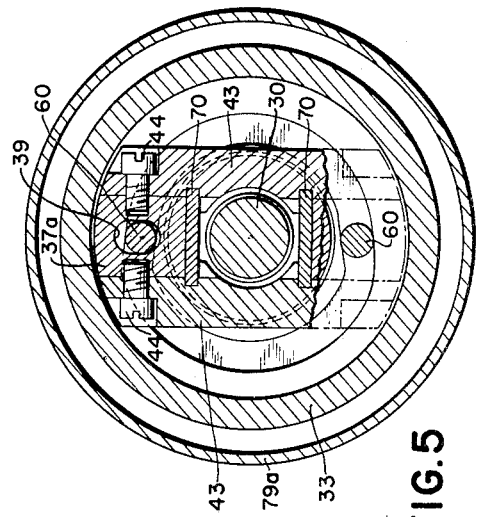
Figure 7:
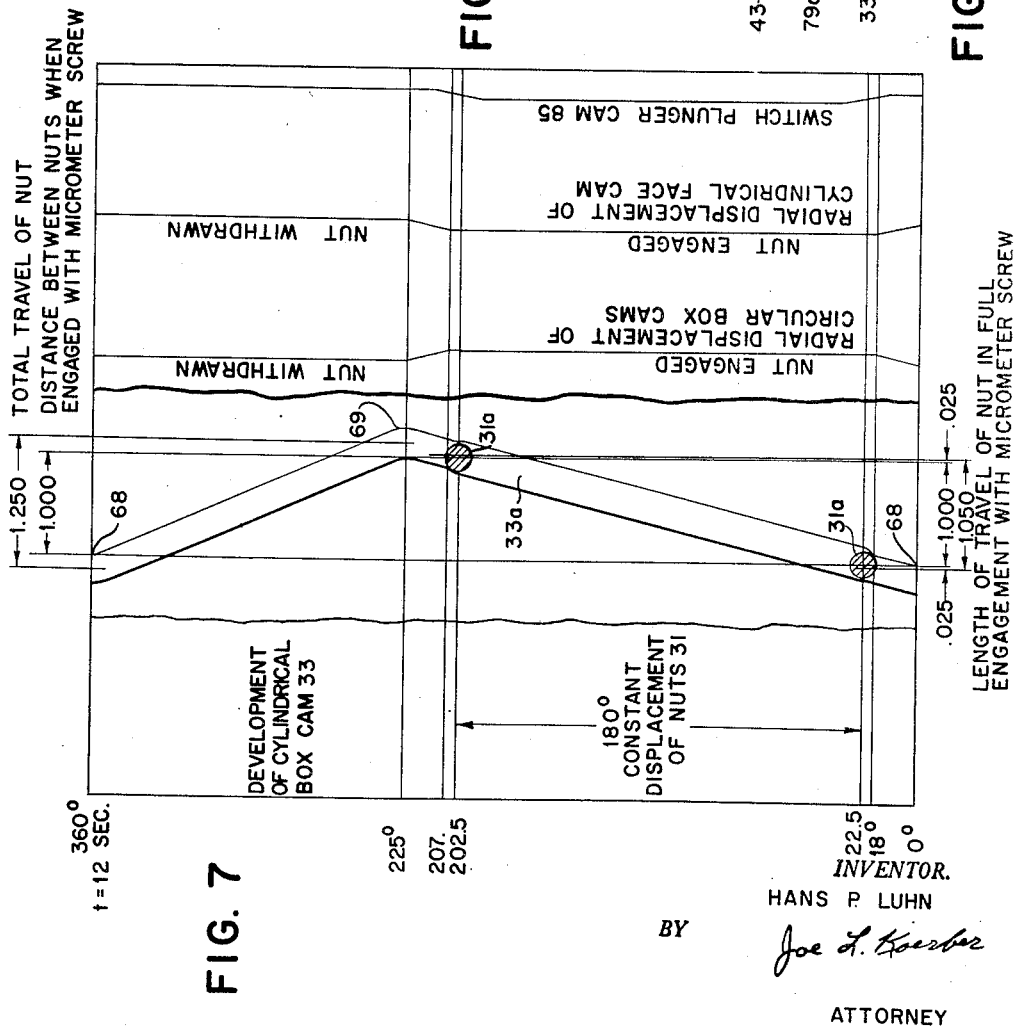

Fig. 4 is a sectional view taken on a line 4—4 in Fig. 2.
Fig. 5 is a sectional view taken on a line 5—5 in Fig. 2.
Fig. 6 is a sectional view taken on a line 6—6 in Fig. 2.
Fig. 7 is a developed section of the cylindrical box cam shown in Fig. 2.

The improved device is illustrated in conjunction with a machine tool wherein the device is used to move a work table longitudinally or laterally or simultaneously both longitudinally and laterally with respect to a constantly rotating but otherwise stationary milling cutter A in such a manner that a work piece secured to the work table will be cut to a desired shape.

Figure 1:
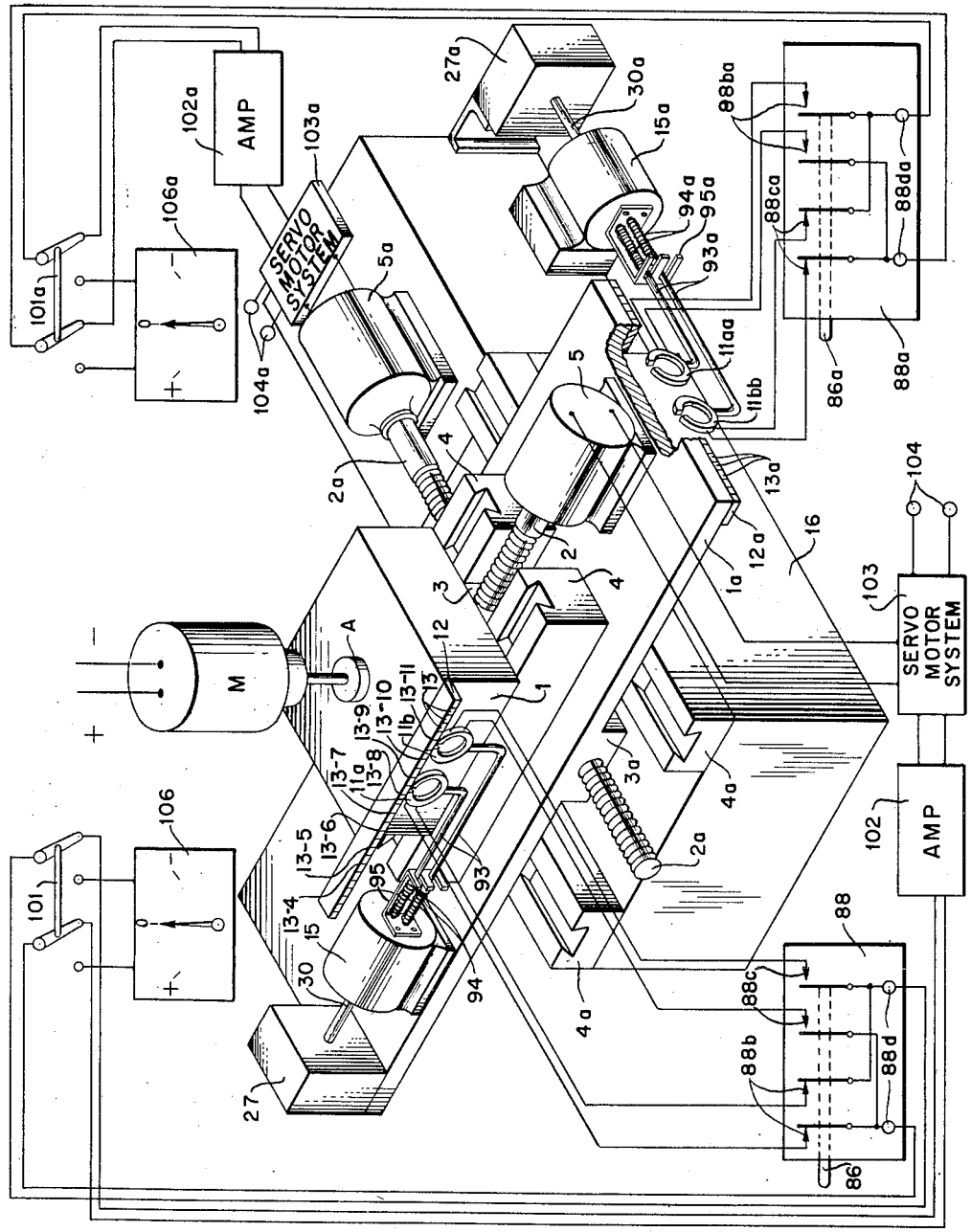
Fig. 1 is a schematic showing of the machine tool and the means for positioning the work table.

Referring to Fig. 1 a work table 1 is provided with a longitudinal lead screw 2 acting with a threaded member 3 fixed to the underside of the work table 1 for providing longitudinal movement of the table 1 on dovetail members 4 affixed to the table 1a, when the lead screw 2 is rotated by a motor 5. The direction of movement of the table 1 is dependent upon the direction of rotation of the motor 5, that drives the lead screw 2. The table 1, dovetail members 4 and drive motor 5 are mounted on a second table 1a having a lateral lead screw 2a acting with a threaded member 3a fixed to the underside of the table 1a for providing lateral movement of both of the work tables 1 and 1a when the lead screw 2a is driven by a motor 5a. By varying the longitudinal and lateral movements of the work table 1 and consequently the work piece (not shown), the latter may be cut to any desired shape.

A pair of static magnetic reading heads 11a and 11b are positioned beneath an index bar 12 fixed to one side of the work table 1. The bar 12 comprises alternate plus and minus magnetic strips, the ends of which are indicated at 13. The heads 11a and 11b may be supported by any suitable means, for example, by antifriction rollers (not shown) for movement in a longitudinal direction at a speed corresponding to the desired speed of longitudinal movement of the table 1. Means for moving the heads are generally designated 15 and will be described in detail hereinafter. The means 15 is mounted on the table 1a. Coaction of the magnetic strips 13 and the heads 11 produces a signal pulse whenever a pair of said strips are not properly aligned with one of said heads, the polarity of said pulse indicating also the direction of misalignment. Conventional means responsive to this error signal are provided for driving the screw 2 to bring the magnetic strips into alignment with the reading heads 11 and will be more fully described hereinafter. In this manner the table 1a is caused to follow the movement of the reading heads.

The foregoing table positioning means comprising the heads 11a and 11b, the magnetic bar 12, the head positioning means 15, the motor 5 and the screw 2 have identical counterparts 11aa, 11bb and 12a, 15a, 5a and 2a for controlling the movement of the second table 1a laterally with respect to the above described movement of the table 1. It will be noted that the table 1 and control means 11a, 11b, 12 and 15 have no relative lateral movement with respect to one another, but rather move together on their common support table 1a. The table 1a is moved by the motor 5a and the screw 2a on dovetail supports 4a affixed to a base member 16. The head positioning means 15a is also fixed to the base member 16.

An input means 27 for driving the unit 15 to move the heads 11a and 11b is mounted on the table 1a and may be any suitable means, for example, that described in Pollard Patent 2,213,108, whereby a shaft, designated 30a in the patent and 30 in this application, is driven selectively in either direction and at varying speeds. An identical input means for driving the unit 15a to move the heads 11aa and 11bb is generally designated 27a and the associated shaft is designated 30a. The unit 27a is mounted on the base member 16. The shaft 30a in the Pollard patent is the rotor shaft of a differential motor. The stator winding is energized from a sixty cycle polyphase supply main whereas the rotor winding is energized by a series of predetermined waves from a photophone amplifier and these waves cause the motor to perform a predetermined series of motions of varying speeds and directions. The photophone comprises a source of light which is projected through a record film to a photocell. The film is driven at a constant speed and variously spaced opaque marks on the film intermittently interrupt the light falling on the photocell, thereby giving rise to electrical impulses in the amplifier that are amplified and produce cycles of current in the rotor of the differential motor. The rotary speed of the motor is determined by the difference in the frequencies of the currents in the rotor and stator and in accordance with the Pollard invention, by providing a particular pattern of opaque marks on the film, the speed and direction of the rotor shaft may be controlled. Reference may be had to the above patent for further details of this device.

*Head positioning mechanism*

In Fig. 2 is shown a sectional view of the device 15 for positioning the static reading heads 11a and 11b for controlling longitudinal movement of the work table 1. The device 15a for positioning the heads 11aa and 11bb for controlling the lateral movement of the work tables 1 and 1a is identical to the device 15 and therefore only the latter will be described.

The device comprises generally the aforementioned shaft 30, a pair of half nuts 31, a pair of circular box cams 32 for moving the half-nuts out of engagement with a threaded portion 30aa of the shaft 30, a cylindrical face cam 33 for moving the half-nuts 31 longitudinally when not engaged with the threads 30aa, and a speed reduction gearing arrangement comprising a 79 tooth pinion 34 and an 80-tooth internal gear 35 for effecting one revolution of the cams 32 and 33 for 80 revolutions of the shaft 30.

Referring to Figs. 2 and 5, there is provided a pair of cylindrical members 37 each having a pair of generally cubical appendages 37a projecting from one end at diametrically opposite points, and extending through each appendage is an opening 39. The left hand member 37 is affixed to a generally circular casting 41 by three screws 42, one of which is shown. The right hand member 37 is fixed to a generally circular casting 82a in a manner described hereinafter. The two members 37 are joined by pairs of longitudinal members 43 as shown in Figs. 2 and 5. The longitudinal members are each fixed to the rectangular members 37 by four screws 44, two of which are shown in Fig. 5. The unit comprising the members 37, 41, 82a and 43 carries a pair of ball bearings 46 that rotatably support the shaft 30. End play of the unit on the shaft 30 is taken up by a circular spring 47 bearing on the outer race of the right hand ball bearing 46 that holds the shaft against a thrust bearing 48.

A member comprising a hub 50 and two cams 51 and 52 is fixed to the shaft 30 by means of a lock screw 53. The cam 51 is circular and is eccentric to the hub 50. The cam 52 is larger than the cam 51 and its eccentricity is in the same direction as that of the cam 51 and of half the magnitude of the latter. The pinion gear 34 is freely mounted on the cam 52 and meshes completely with the internal gear 35 at only one point 54 (see Fig. 3). The left hand one of the aforementioned circular box cams 32 is affixed to the internal gear 35 by three screws 56, one of which is shown. The aforementioned cylindrical box cam 33 is affixed to the cams 32 by six screws 57, two of which are shown. The unit comprising the cams 32 and 33 and the internal gear 35 is mounted on the members 37 by a pair of ball bearings 58.

A pair of rods 60 extend through the slots 39 in the members 37 and into a pair of cam grooves 32a in the circular box cams 32. As shown in Figs. 4 and 5, cam grooves 32a have portions 32b and 32c, the latter of which is nearer the cam center than the former. The portion 32b comprises 135 degrees of the cam periphery, whereas the portion 32c comprises 189 degrees. The transition from the portion 32b to the portion 32c and the subsequent transition back, each occupy 18 degrees of the periphery. The rods 60 are held against rotation with the cams 32 by the slotted members 37. When the cams 32 are rotated, the rods 60 are alternately moved away from the shaft 30 by the camming action of the cams 32.

The rods 60 pass loosely through holes 62 in the half-nuts 31, and as the rods 60 are alternately cammed away from the shaft 30, the half-nuts 31 are disengaged from the threads 30aa on the shaft 30. Each half-nut 31 has a stud 31a. The half-nuts 31 are alternately moved into engagement with the threads 30aa as follows: Each half nut 31 is split as indicated at 66 in Fig. 4 forming an inner part 31-I and an outer part 31-O. A curved piece of spring steel (not shown) is interposed between the two parts and tends to separate them thereby exerting a pressure. A cam surface 33b paralleling the cam grooves 32a is formed on the cylindrical cam 33 and is adapted to bear against the nut portion 31-O. The cam 33 is so oriented with respect to the cam 32 that as a rod 60 reaches the inner cam portion 32c, of the cam groove 32a, the nut portion 31-O is cammed inwardly and through the spring (not shown) yieldingly moves the associated half-nut 31-I into engagement with the threads 30aa. The associated rod 60 is cammed inwardly by the action of the half-nut. In the foregoing manner it will be seen that the half-nuts are moved out of engagement with the threads 30aa by the cams 32 and rods 60; and that the half-nuts are moved into engagement with the threads by the cam surface 33b.

The cam groove 33a, as seen in the developed view Fig. 7 may be described as starting at a point 68 and following a helical path about the cylinder 33 that runs at a steady rate for a longitudinal distance of 1.250 inches to a point 69 while traversing 225 degrees of the cylinder circumference. At the point 69 the cam groove 33a reverses its longitudinal direction and traverses the remaining 135 degrees of the cylinder while returning at an accelerated rate to the starting point 68. It will be noted that one portion of the cam groove 33a is wider than the other portion. The cam groove 33a is so oriented with respect to the cam grooves 32a that the stud 31a of a currently disengaged half-nut 31 will be in the narrow part of the groove 33a and the half-nut will be moved longitudinally of its rod 60 by a camming action of the narrow part of the groove 33a. When a half-nut 31 is engaged with the threaded portion 30aa of the shaft 30, its stud 31a is in the wide part of the groove 33a, touching neither side of the groove, and is moved longitudinally by contact with the rotating threaded shaft 30.

It will be noted in Fig. 4 that the cam portion 32c covers more than 180 degrees of the circumference of the groove 32a and that both rods 60 are in the portion 32c at the same time. The foregoing is necessary to provide continuous control. The disengaged half-nut 31 is brought into engagement with the threads 30aa before the engaged half-nut is disengaged, thereby permitting an instantaneous transfer of control through the operation of an electric switch which will be more fully described hereinafter. As mentioned previously the cam groove 33a covers a longitudinal distance of 1.250 inches whereas the control distance of a half-nut is 1.000 inch. The additional 0.250 inch is required for the foregoing smooth transition of control from one half-nut to the other.

In the described manner one half-nut 31 moves to the left or right while the other half-nut moves in the opposite direction. Each half-nut is alternately engaged with and disengaged from the threaded shaft 30 and is driven in one direction by the shaft 30 and is returned in the other direction by the cam groove 33a.

Referring to Figs. 2 and 5, each half-nut 31 when moved to the right, bears against a pusher rod 70 that is slidably supported in slots 71 in the members 37. As a half-nut is oscillated up and down, it slides freely against a flange formed on the left end of the rod 70. When a half nut is moved to the left, the associated pusher rod 70 follows to the left by means to be described hereinafter. Means for effecting one revolution of the cams 32 and 33 while the shaft 30 rotates eighty times for driving the half-nut is under control of the shaft 30 and the aforementioned eccentrics 51 and 52. Referring to Figs. 2 and 3, an arm 72 is freely mounted on the eccentric 51. A block 73 is pivotally mounted by a pin 74 fixed in an end plate 75 that is fixed by four screws 76 to two ears 41a that are formed on the member 41. Two of the screws 76 are shown in Fig. 2. A block 78 similar to the block 73 is pivotally mounted on the pinion 34 by a pin 79. Respectively closed and open slots 81 and 82 in the arm 72 slidably engage the blocks 78 and 73. When the shaft 30 rotates, the pinion 34, because it is mounted on the eccentric 52, will be caused to gyrate and the point of contact 54 between the pinion 34 and the gear 35 will progress around the periphery of the pinion 34. Because of the 79 to 80 ratio of teeth, the pinion 34 will complete 80 gyrations while the gear 35 completes one revolution. The purpose of the eccentrics 51 and 52, the arm 72 and the blocks 73 and 74 is to effect a true gyration of the pinion 34 instead of a combination of gyrations and rotation. The eccentrics 51 and 52 are eccentric in the same direction and therefore will move the pinion 34 and the arm 72 simultaneously in the same direction. During the sideways movement of the arm 72, the block 73 serves as a pivot point. The block 78 is half way between the center lines of the shaft 30 and the block 73 and because of the double eccentricity of the eccentric 51 with respect to the eccentric 52, the block 78, which is pinned to the pinion 34, will move the same distance sideways as does the center of the pinion 34. It will be noted that two initially vertically aligned points on the pinion thereby remain in vertical alignment at all times and the described movement of the pinion constitutes a true gyration. A cover member 79a fits into an annular groove 80 formed in the end plate 76 and is held in place by three screws 81a, one of which is shown, screwed into the circular member 82a that in turn is fixed to the right hand member 37 by a pair of screws 83.

Formed on the right end of the right hand cam member 32 is a cam surface 85 that is adapted to operate a plunger 86 that is contained in the member 82a and is biased to the left by a spring 84. The cam 85 is so formed as to oscillate the plunger 86 once during each revolution in timed relation to the engaging and disengaging of the half-nuts 31. The plunger 86 operates a plunger 87 of a double pole double throw switch 88 that is mounted on a flange portion of the member 82a. A cover member 89 fits over the right hand end of the unit 15 and is held thereon by three screws 90, one of which is shown. The screws 90 extend through tubes 91 formed on the cover member 89, through holes in the cover member 79a and into threaded holes in the member 82a.

A pair of rods 93 on which the aforementioned magnetic heads 11 are mounted extend through holes in the cover member 89 and the member 82a to abut the right hand ends of the aforementioned pusher rods 70. Each rod 93 is biased to the left by a spring 94 that is contained at its right end by a bracket 95 that is mounted on the cover 89 as shown in Fig. 1, and at its left end by a collar 96 that is fixed to the rod 93 as shown in Fig. 2. It is apparent that the pusher rods 70 and the head carrying rods 93 are alternately moved to the right by the associated half-nuts 31 and returned to the left by the springs 94.

*Heads and circuit for error pulse*

The reading heads 11a, 11aa, 11b and 11bb, shown in Fig. 1, may be of the type described in detail in the Patent No. 2,700,703 issued January 25, 1955 to H. W. Nordyke, and entitled Magnetic Reproducer. The head comprises two cores having air gaps, one core having a pair of windings for applying a varying high frequency voltage to cause a change in effective reluctance of a part of the second core that is positioned in the air gap of the first core. A constant magnetomotive force applied to the gap of the second core, as by a magnetized strip 13 or 13a of the present invention, will induce voltages in a winding on the second core by virtue of a change of flux which is brought about by the changing effective reluctance of the portion of the second core which is positioned in the air gap of the first core.

If the reluctance of the second core is changed in a particular way, that is, if the variation in the reluctance is made at a greater rate when decreasing as compared with the rate when increasing or vice versa, the core may be made sensitive to the polarity of a magnetized section. The sensing of a positive section will make one terminal of the winding of the second core positive and the other terminal negative; whereas the sensing of a negative spot will reverse the polarity of the winding terminals.

The windings of the head 11a are connected to two input terminals 88b of the switch 88 and the windings of the head 11b are similarly connected to two other input terminals 88c. The switch 88 has two output terminals 88d connected through a switch 101 to amplifying means 102 which amplify the signals from the heads 11 and feed the amplified signals to any suitable servomotor system represented by a block 103. Power is supplied to the servomotor system 103 from a conventional power supply through terminals 104 and is controlled by the polarized pulses from the heads 11a and 11b to drive the motor 5 selectively in either direction whereby the motor drives the screw 2 to position the table 1 such that adjacent magnetically plus and minus strips 13 are aligned with the controlling head 11a or 11b so that no signals are derived from the controlling head. The cam 85 is so arranged as to always have the currently controlling head 11a or 11b connected to the output terminals 88d of the switch 88.

A control unit and associated parts identical to those described for use with the heads 11a and 11b are provided for use with the table 1a for effecting lateral movements of the work table 1a and, due to the mounting of table 1 on the table 1a, the lateral movement of the table 1. These counterparts are designated by the same numbers as the described parts followed by the letter "a."

It is understood, of course, that the induced voltage in the windings of the second cores of the heads may be amplified by conventional means well known in the art. These amplifiers being no part of the present invention are not described herein but are represented by block diagrams 102 and 102a. Also in the case of the servomotor systems 103 and 103a, many systems for receiving error signals and controlling motors in response thereto are well known in the art. The servomotor systems, not being inventive features and being so well known in the art as to be regarded as conventional, are not described herein but are represented only by block diagrams designated 103 and 103a.

It is necessary that an initial alignment of the controlling heads be made whereby the controlling heads are centered between a pair of magnetic strips with plus strips to the left and minus strips to the right of center of the controlling heads, since the sensing of plus strips is adapted to cause movement of the associated tables to the left and the sensing of minus strips to cause movement to the right. If the initial alignment were erroneously reversed, the sensing of either polarity would cause movement of the associated table in the wrong direction. Normally, one of the heads 11a or 11b, is connected through the microswitch 88 and the manual switch 101 to the amplifier 102. The initial alignment of the table 1 with the controlling head 11a or 11b is obtained through the use of a zero-center voltmeter 106. The controlling head 11a or 11b is connected to the meter 106 by the manual switch 101. The controlling head is initially misaligned to obtain a polarity check to assure that the head is positioned with a plus strip to the left and a minus strip to the right. The shaft 30 is then manually rotated in the appropriate direction until the meter 106 reads zero. The controlling head is at that time properly aligned. Elements 88a, 101a, 102a and 106a corresponding to the elements 88, 101, 102 and 106 are associated with the heads 11aa and 11bb for obtaining the initial alignment of the table 1a.

With a work piece on the table 1 and with both tables adjusted so that the magnetic heads are properly positioned with respect to the magnetic bars 12 and 12a, the machine is in readiness for operation.

The control unit, for example the film unit shown in the Pollard patent, is started. The film contains a control track for the unit 27 and a control track for the unit 27a so that the two units are synchronized. The operation of the unit 27 and associated parts will be described and it will be understood that the similar unit 27a and associated parts operate in a like manner. Assume that the control film is so marked as to cause a four inch movement of table 1 to the right.

At the instant the unit 27 is actuated, one of the heads 11a or 11b, for example the head 11a, is in alignment with one of the pairs of plus and minus strips 13, for example the eighth pair from the left end of the bar 12, that in this example is designated 13—8. The head 11b is at the same instant in alignment with another pair of plus and minus strips for example the eleventh pair from the left end, herein designated 13—11. The shaft 30 is driven by the unit 27 in the manner described hereinbefore, and through the unit 15, drives the half nut 31 that is associated with the head 11a, for example to the right. The minus strip of each pair of strips 13 is to the right of the plus strip and the head 11a therefore senses the minus strip and delivers an error pulse to the servomotor system to drive the motor 5 in a direction whereby the screw 2 moves the table 1 to the right an amount sufficient to realign the pair of strips 13—8 with the head 11a. However, the head 11a is still moving to the right in response to the control unit 27, thereby maintaining the state of misalignment between the head 11a and the pair of magnetic strips 13—8 and the table 1 is moving to the right trying to overcome the state of misalignment. While the head 11a is being driven to the right by the control unit 27, the head 11b is being driven to the left so that after the head 11a has moved one inch to the right, the head 11b has moved one inch to the left and is now aligned with the ninth pair of strips 13—9 instead of with the eleventh pair of strips 13—11. After the full inch of movement to the right, the nut 31 driving the head 11a is disengaged from the shaft 30aa within the unit 15, and the nut 31 associated with the head 11b is engaged therewith. The cam surface 85 operates the switch 88 to disconnect the head 11a and to connect the head 11b. The head 11b is now the controlling head and it is moved to the right with the table 1 following in the manner described for the first inch of movement under control of the head 11a. As the head 11b moves to the right, the head 11a is returned to the left by the unit 15 so that at the end of the second inch of table movement the head 11a is now aligned with the pair of magnetic strips 13—6 instead of 13—8. Also at the end of the second inch of table movement the head 11a is again made the controlling one and the head 11b is disconnected. While the head 11a moves to the right with the strips 13—6 following and attempting to remain in alignment therewith, the head 11b moves to the left so that at the end of the third inch of movement the head 11b is in alignment with the strips 13—7. Also at the end of the third inch of movement to the right the head 11b is made the controlling head and the head 11a is disconnected. The head 11b moves to the right with the strips 13—7 and the table 1 following while the head 11a returns to the left so that at the end of the fourth inch of movement to the right the head 11a is in alignment with the strips 13—4 and the head 11b is in alignment with the strips 13—7.

If the direction of movement of the table is changed by reversing the rotation of the shaft 30 after one of the heads 11a or 11b has been in control for half an inch of movement, the same head controls for half an inch of movement in the opposite direction before the other head takes control.

In the described manner, the work table 1 and the work piece mounted thereon are moved with respect to the cutting tool A to produce the desired pattern.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A machine for performing a predetermined operation on a workpiece comprising, in combination, a driven forming member, a workpiece support member, means for holding one of said members in a fixed position, means for movably supporting the other of said members, a magnetized element affixed to the movable one of said members and comprising alternately polarized sections disposed along a longitudinal axis of said element, magnetic sensing means positioned adjacent said element and movable in a path parallel to said longitudinal axis, said sensing means operating to emit pulses corresponding to the polarity of the section immediately adjacent thereto and being inoperative to emit pulses when in an aligned position between two adjacent polarized sections, means for moving said sensing means, a motor operatively connected to the movable one of said members, and control means operating selectively in response to said pulses for energizing said motor to move said movable member in the same direction as said sensing means.

2. A machine for performing a predetermined operation on a workpiece according to claim 1 in which said magnetic sensing means comprise a pair of magnetic heads adapted for reciprocating motion, said heads being adapted for controlling said motor control means alternately, each of said heads being the controlling one during its movement in the direction of the desired movement of said movable member.

3. A machine for performing a predetermined operation on a workpiece according to claim 1 in which said means for positioning said magnetic heads comprise, a threaded rotatable shaft, means for rotating said shaft selectively variable amounts in either direction selectively and at selectively variable speeds, a pair of threaded members connectible with said shaft, means for alternately connecting and disconnecting said threaded members with said shaft in alternation with each other, means for moving the currently disconnected one of said threaded members in one direction while the currently connected one is driven in the opposite direction through its connection with said shaft, means connecting each threaded member with one of said magnetic heads so each head follows the movements of the respectively associated threaded members, means operable for connecting said heads alternately with said motor control means so the connected one of said heads is the one controlled by the currently connected threaded member.

4. A machine for performing a predetermined operation on a workpiece according to claim 1 in which said means for positioning said magnetic sensing means comprise, a rotatable shaft having a threaded portion, means for rotating said shaft selected amounts in either direction selectively and at selectively variable speeds, a pair of half-nuts, means operable by said shaft for transmitting a reciprocating radial movement to said half-nuts whereby one of said half-nuts is alternately engaged with and disengaged from said threaded portion of said shaft while the other said half-nut is respectively disengaged therefrom and engaged therewith; means operable for moving the currently disengaged one of said half-nuts in one direction while the currently engaged half-nut is driven in the opposite direction through its engagement with said threaded portion of said rotating shaft; means connecting each half-nut with one of said heads so each head follows the movement of the respectively associated half-nut, switch means operable by first said operable means for connecting said magnetic heads alternately with said motor control means so the head is associated with the currently engaged half-nut is connected with said motor control means.

5. A machine for performing operations on a workpiece comprising, in combination, a driven forming member, a workpiece support member, means supporting said support member for movement in a fixed path relative to said forming member, a magnetized element mounted on said support member and comprising alternately polarized sections disposed in a line extending parallel to said path, magnetic sensing means positioned adjacent said element and movable in a path parallel to the path of movement of said support member, said sensing means operating to emit pulses corresponding to the polarity of the section immediately adjacent thereto and being inoperative to emit pulses when in an aligned position between two adjacent polarized sections, means for moving said sensing means, a motor operatively connected to said support member for moving the latter, and control means operating selectively in response to said pulses for energizing said motor to move said support member in the same direction as said sensing means.

6. A machine for performing operations on a workpiece comprising, in combination, a driven forming member, a workpiece support member, means supporting said support member for movement in a fixed path relative to said forming member, a magnetized element mounted on said support member and comprising alternately polarized sections disposed in a line extending parallel to said path, a pair of magnetic sensing devices positioned adjacent said element and movable in a path extending parallel to the path of movement of said support member, said sensing devices operating when moved in one direction to emit pulses corresponding to the polarity of the section immediately adjacent thereto and being inoperative to emit pulses when moved in the opposite direction or when in an aligned position between two adjacent polarized sections, means for moving said sensing devices in an oscillatory manner approximately 180° out of phase with each other, a motor operatively connected to said support member for moving the latter, and control means operating in response to the pulses from said sensing devices for energizing said motor to move said support member in the same direction as the sensing device from which the pulses are emitted.

7. The machine of claim 6 in which said means for moving said sensing devices comprises a pair of half-nuts, one connected to each of said sensing devices, a rotatable shaft having a threaded portion engageable by said half-nuts for moving the latter in one direction, a rotatable member having a cam surface engageable by said half-nuts for moving the latter in the opposite direction, means for rotating said shaft and said rotatable member, and means for engaging said half-nuts alternately with said shaft and said cam surface.

8. A positioning apparatus comprising, in combination, a pair of control members, a first driven means, a second driven means for connecting said control member alternately with said first and said second driven means whereby one of said control members is connected with said first driven means for movement in one direction while the other of said control members is connected with said second driven means for movement in the opposite direction, index means having a plurality of linearly spaced index points arranged along a longitudinal axis parallel to the direction of movement of said control members and mounted for movement along said axis, a pair of sensing means connected for movement with said control members, said sensing means being operative to emit electrical pulses when misaligned relative to any of said index points, a motor operatively connected for moving said index means along said axis, means operable by said pulses for energizing said motor and connectible alternately with said pair of sensing means, means operable for connecting the one of said sensing means connected with the one of said control members currently connected to said first driven means with said motor energizing means, means for driving said first driven means predetermined amounts selectively in either of two directions for moving last sensing means to a position of misalignment relative to a selected one of said index points whereby said pulses energized said motor to move said selected index point to a position of alignment relative to last said sensing means and through successive steps of misalignment and subsequent realignment under the alternating control of said control members, said index means are moved a distance proportional to said predetermined amounts.

9. A positioning apparatus comprising, in combination, a pair of control members, a first driven means, a second driven means, means for connecting said control members alternately with said first and said second driven means whereby one of said control members is connected with said first driven means for movement in one direction while the other of said control members is connected with said second driven means for movement in the opposite direction, index means having a longitudinal axis and mounted for movement along said axis, a pair of sensing means associated with said control members for movement therewith, said sensing means being operative to emit electrical pulses in certain positions relative to said index means and being inoperative in other positions relative to said index means, a motor operatively connected for moving said index means along said axis, means operable by said pulses for energizing said motor and connectible alternately with said pair of sensing means, means operable for connecting the one of said sensing means connected with the one of said control members currently connected with said first driven means with said motor energizing means, means for driving said first driven means predetermined amounts selectively in either of two directions for moving last sensing means from a selected inoperative position relative to said index means to an operative position whereby said pulses energize said motor to return said index means to said selected inoperative position and through successive steps of movement to said operative position and subsequent return to said inoperative position under the alternating control of said control members said index means are moved a distance proportional to said predetermined amounts.

10. A positioning apparatus comprising in combination, a rotatable threaded shaft, a pair of threaded members connectible with said shaft for movement longitudinally of said shaft when said shaft is rotated, means operative for connecting said threaded members alternately with said shaft, means operative for moving the currently disconnected one of said threaded members oppositely of the movement of the currently connected one of said members, means operative concurrently with first said connecting means for connecting said threaded members alternately with said moving means, an index element mounted for movement along an axis parallel to the axis of said shaft and having a plurality of equally spaced index points disposed along said axis, sensing means controlled for movement with said threaded members, said sensing means being positioned adjacent said index element and being operative for emitting electrical pulses when misaligned with any of said index points and inoperative when aligned with any of said index points, means for rotating said shaft selectively in either of two directions a determinable number of rotations whereby said sensing means controlled by said currently connected one of said threaded members is misaligned with a selected one of said index points, a motor operatively connected for moving said index element along said axis, means connectible alternately with said sensing means and operable by said pulses for energizing said motor whereby said index element is moved to realign said selected index point with the currently connected one of said sensing means, means operative for connecting said sensing means controlled by said currently connected threaded member with said motor energizing means and for disconnecting said sensing means controlled by said currently disconnected threaded member whereby through successive steps of misalignment and subsequent realignment said index element is moved a distance proportional to said number of revolutions.

11. A machine for effecting predetermined relative movements between a forming member and a workpiece support member comprising, in combination, a driven forming member, a workpiece support member, means for holding one of said members in a fixed position, means for movably supporting the other of said members, index means affixed to the movable one of said members, means positioned adjacent said index means and operative for emitting electrical pulses when misaligned relative to said index means, a motor operatively connected for moving the indexed one of said members relative to the other of said members, means for moving said operative means to a position of misalignment relative to said index means, means operable by said pulses for energizing said motor whereby said indexed member is moved to a position to realign said index means relative to said operable means, means operable for continuously and selectively actuating said misaligning means in a predetermined manner whereby said realigning movements form said predetermined movement.

12. A machine for forming a workpiece in a predetermined shape comprising, in combination, a driven forming element, a workpiece support member mounted for movement along longitudinal and lateral axes, a motor operably connected for effecting said longitudinal movement, a motor operably connected for effecting said lateral movement, a magnetic element mounted for longitudinal movement with said support member, a magnetic element mounted for lateral movement with said support member, said magnetic elements comprising alternately polarized sections arranged along respectively longitudinal and lateral axes, magnetic sensing means positioned adjacent each of said magnetic elements and movable parallel to the axes of the respectively adjacent magnetic elements, said sensing means being inoperative when in an aligned position between adjacent ones of said polarized sections and operative to emit polarized electrical pulses corresponding to the immediately adjacent polarized section when not so aligned, means for moving said longitudinally and laterally movable sensing means selectively along their respective axes from said aligned positions, means operable by said polarized pulses from said longitudinally movable sensing means and said laterally movable sensing means respectively for actuating said longitudinal and lateral moving motors to move said support member in the same directions as said respective longitudinally and laterally movable sensing means.

13. A machine for forming a workpiece in a predetermined shape comprising, in combination, a driven forming element, a first table member mounted adjacent said forming element and movable in a plane parallel thereto, a motor operably connected for moving said first table member along a longitudinal axis, a second table member supporting said first table member, a motor operably connected for moving said second table member in a plane parallel to first said plane and along a lateral axis relative to first said axis, a magnetized element affixed to said first table member comprising a plurality of alternately polarized sections arranged along an axis parallel to said longitudinal axis, a magnetized element affixed to said second table member comprising a plurality of alternately polarized sections arranged along an axis parallel to said lateral axis, magnetic sensing means positioned adjacent each of said magnetized elements and movable parallel thereto along said longitudinal and lateral axes respectively, said sensing means being inoperative when in an aligned position between adjacent ones of said polarized sections and being operative to emit polarized electrical pulses when not so aligned, control means associated respectively with said longitudinally and laterally movable sensing means and operable by said polarized pulses for energizing respectively said motor for moving said first and second table members and their respectively affixed magnetic elements to positions of alignment with said sensing means, and means for continuously misaligning said sensing means selectively in either direction along their respective axes in a predetermined manner whereby the combination of longitudinal and lateral aligning movements cause said first table member to trace a predetermined path with respect to said forming element.

14. A machine for performing a predetermined operation on a workpiece comprising, in combination, a driven forming member, a workpiece support member, means for holding one of said members in a fixed position, means operably connected for moving the other of said members relative to said one member in a translatory manner and in a single plane, a magnetic element affixed to the movable one of said members and comprising alternately polarized sections arranged along an axis of said element, magnetically sensitive means mounted adjacent said magnetic element and movable parallel to said axis, said sensing means being inoperative when aligned between adjacent ones of said polarized sections and being operative when not so aligned to emit polarized electrical pulses corresponding to the polarity of the immediately adjacent one of said polarized sections, means for misaligning said sensing means selectively and continuously in a predetermined manner, means operable by said polarized pulses for operating said means for moving said movable one of said members, whereby said magnetic element and said magnetic sensing means are realigned.

References Cited in the file of this patent

UNITED STATES PATENTS 2,213,108   Pollard _____ Aug. 27, 1940